United States Patent [19]

Bodley-Scott

[11] Patent Number: 4,817,040
[45] Date of Patent: Mar. 28, 1989

[54] VEHICLE CONDITION MONITORING SYSTEM

[75] Inventor: Jamie Bodley-Scott, Witney, England

[73] Assignee: Lucas Industries Public Limited Company, Birmingham, England

[21] Appl. No.: 27,335

[22] Filed: Mar. 18, 1987

[30] Foreign Application Priority Data

Mar. 20, 1986 [GB] United Kingdom ............... 8606955

[51] Int. Cl.$^4$ ..................... G06F 15/20; H03M 1/50
[52] U.S. Cl. ..................... 364/424.04; 340/459; 341/166
[58] Field of Search ............... 364/424, 550, 551; 340/52 R, 52 F, 347 NT, 347 AD

[56] References Cited

U.S. PATENT DOCUMENTS

| | | | |
|---|---|---|---|
| 3,747,089 | 7/1973 | Sharples | 340/347 NT |
| 3,749,894 | 7/1973 | Avdeef | 340/347 NT X |
| 4,188,618 | 2/1980 | Weisbart | 364/424 |
| 4,257,034 | 3/1981 | Wilkinson | 340/347 NT |
| 4,258,421 | 3/1981 | Guhass et al. | 364/424 |
| 4,551,801 | 11/1985 | Sokol | 364/551 X |
| 4,580,127 | 4/1986 | Blowers | 340/52 R X |
| 4,622,538 | 11/1986 | Whynacht et al. | 364/436 X |
| 4,626,996 | 12/1986 | Arlott | 364/424 |
| 4,630,043 | 12/1986 | Haubner et al. | 364/424 X |
| 4,644,494 | 2/1987 | Muller | 364/900 |

FOREIGN PATENT DOCUMENTS 1501573 2/1978 United Kingdom .

OTHER PUBLICATIONS

Electronic Analog/Digital Conversions by Hermann Schmid, Published on 1970, Publisher: Van Nostrand Reinhold Company, pp. 282-288.

*Primary Examiner*—Gary Chin
*Attorney, Agent, or Firm*—Nixon & Vanderhye

[57] ABSTRACT

A condition monitoring system for a vehicle comprises a central control unit and a plurality of remote data acquisition modules, each of the modules being connected to the central control unit over a single wire and having a plurality of inputs connected to local condition-sensing transducers. Each data acquisition module serves to store data representing signals received at its inputs. The central control unit prompts the modules in turn and each module, when prompted, transmits its stored data to the central control unit over the respective single wire. This system provides a simplification of the wiring and connectors required between the various transducers and the central control unit, which drives displays displaying the conditions of the transducers.

10 Claims, 7 Drawing Sheets

VEHICLE CONDITION MONITORING SYSTEM

This invention relates to a condition monitoring system in or for a vehicle and to a data acquisition monitor for use in such a system.

Vehicle condition monitoring systems are important features of most new vehicles nowadays. They perform useful and often vital functions in giving instant information as to the condition or status of various items of equipment of the vehicle, ranging for example from a "low washer fluid" to the more serious "low brake fluid" or "low oil level" warnings. This information becomes available to the driver upon turning the ignition key so that the driver becomes aware of the vehicle condition before commencing a journey. This leads to a safer vehicle environment both for the user of the vehicle and other road users, and also improves serviceability since faults with any of the vehicle equipment are indicated before they reach danger level.

Present vehicle condition monitoring systems comprise three basic units, namely a central monitoring module, a central lamp failure unit and a display module. The central monitoring module is usually microprocessor-based and all sensor information from around the vehicle is fed back to this module via parallel inputs. Typical monitoring functions include lamp failure for all external bulbs, doors or boot open, low oil level, low oil pressure, low fuel level, high engine temperature, low gearbox oil level, brakepad wear, brake fluid level, air brake pressure, coolant level, washer level, park brake on, lights on and main beam, direction indicators, battery charge, etc. The microprocessor decodes all the input states to determine valid and non-valid inputs together with sensor failure information and it generates output signals for the display module.

It is important that the vehicle condition monitoring system (comprising transducers, switches, wire harnesses, connectors, electronic hardware and displays) should exhibit a high degree of reliability. Design criteria are important to ensure that the system can be installed simply and easily and achieve maximum reliability. However, in the present condition monitoring system, there are inherent problems. Every sensor or switch around the vehicle requires a dedicated input to the central monitoring module. This involves large numbers of parallel inputs all using two connectors, with some wires passing through three or four connections. This leads to a highly complex wiring harness for the vehicle, with attendant reliability problems and high costs for all the wiring and connectors involved. This problem is reflected in assembly and tends to limit the number of functions or items of equipment which are monitored.

In accordance with this invention there is provided in or for a vehicle, a condition monitoring system comprising a central control unit and a plurality of remote data acquisition modules, each data acquisition module being connected to the central control unit over a single wire and having a plurality of inputs connected or connectable to local condition-sensing transducers, each data acquisition module serving to store data representing signals received at its inputs, the central control unit serving to prompt each data acquisition module in turn over the respective single wire, and each data acquisition module further serving, when prompted, to transmit its stored data to the central control unit over the respective single wire.

Thus, the data acquisition modules may be strategically placed around the vehicle and acquire information from transducers in their local vicinity, for example digital switch inputs from e.g. the doors or the trunk, lamp failure inputs and analogue inputs representing for example fuel level, engine temperature, etc. The stored data is transmitted in serial format over the single wire to the central control unit. This control unit may be arranged to decode the information in known manner and drive the appropriate displays. These displays may be of known types or combinations of types.

This vehicle condition monitoring system leads to a considerable reduction in wiring and the number of connectors and terminations required. This provides the vehicle manufacturer with more flexibility in wiring harness design and the system is able to cope with a greater number of monitored functions. The system can also lead to improvements in vehicle diagnostic capability, both at the production line end and for later servicing of the vehicle. The system also provides for greater inherent reliability.

Also in accordance with this invention there is provided a data acquisition module comprising a plurality of inputs and an input/output terminal for connection to a single communication wire, the module being arranged to store data representing signals received at its inputs and to transmit this stored data via the input/output terminal in response to a prompt signal received at said terminal.

Preferably each data acquisition module is based on a small and simple microprocessor which is only powered up when the vehicle ignition is switched on and is otherwise totally inactive. In an embodiment to be described below, the central control unit periodically sends a "wake-up" signal to each data acquisition module in turn. On receipt of such a signal, the data acquisition module transmits its stored data in serial format over the single wire to the central control unit. Then the data acquisition module updates all its input information in readiness for the next "wake-up" signal. Protection against noise is given in that each data acquisition module reads all of its inputs several times, each time comparing the input pattern with the previous pattern, before storing the data ready for transmission to the central control unit.

In the embodiment to be described below, each data acquisition module has a number of switched inputs (i.e. "on" or "off") and an analogue input: the module effects analogue to digital conversion in a simple manner utilizing the microprocessor.

Further in accordance with this invention there is provided an analogue to digital converter comprising a capacitor, means for charging (or discharging) the capacitor through a reference resistor, a control means for determining the time taken for the capacitor to charge (or discharge) to a predetermined level through the reference resistor, and means for correspondingly charging (or discharging) the capacitor through a transducer of variable resistance when connected to an input of the converter, the control means further serving to determine the time taken for the capacitor to charge (or discharge) to said predetermined level through said transducer and to compare the two time periods to provide a digital representation of the transducer resistance.

An embodiment of this invention will now be described by way of example only and with reference to the accompanying drawings in which.

Figure 1:
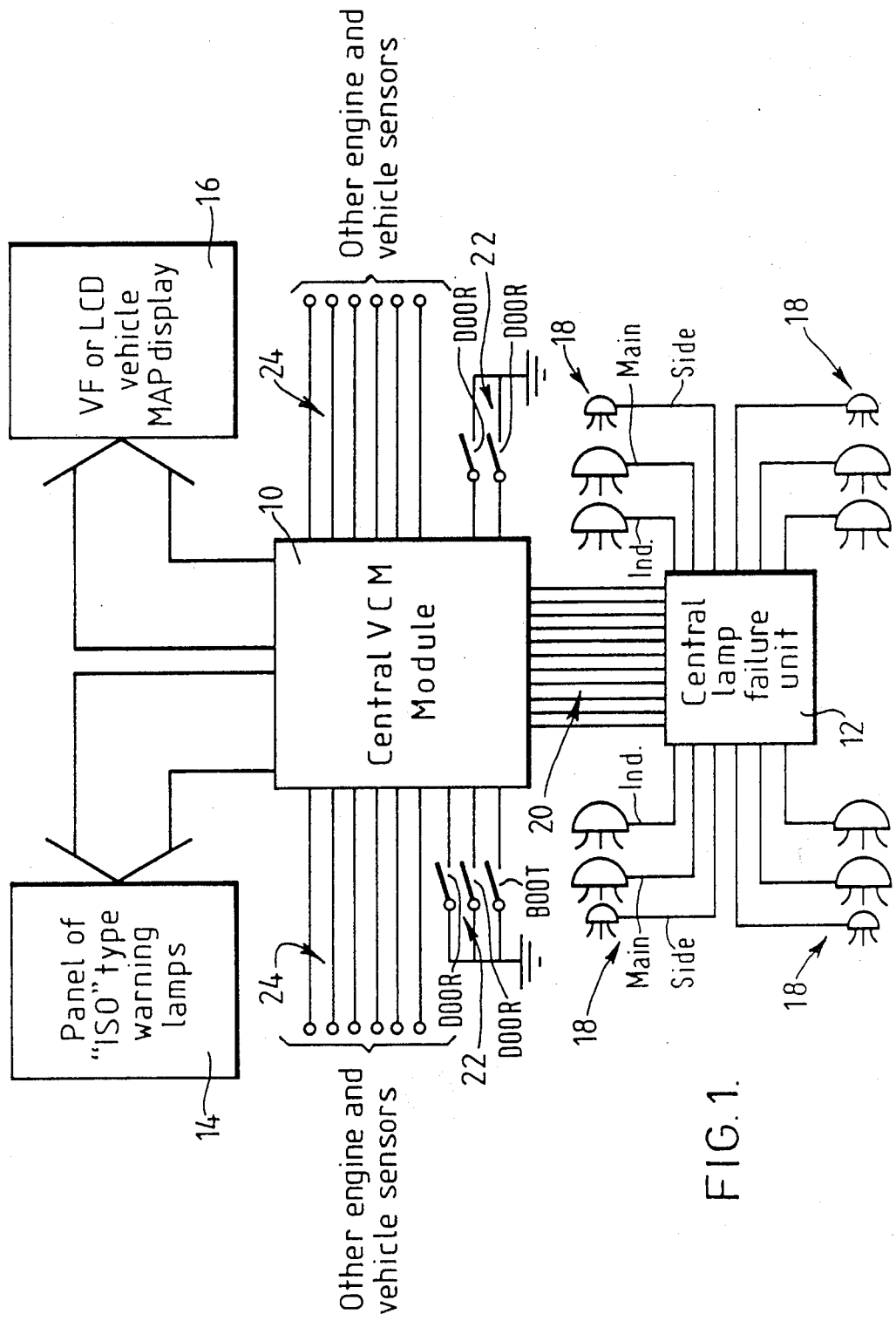
FIG. 1 is a schematic diagram of a typical prior art vehicle condition monitoring system.

Referring firstly to FIG. 1, there is shown a typical present-day vehicle condition monitoring system. This comprises a central monitoring module 10 and a central lamp failure unit 12, the module 10 driving displays 14, 16. The lamp failure unit monitors the state of the external vehicle lights, shown diagrammatically at 18. Each input to this unit 12 is related to a particular light bulb and monitors current flow and voltage drop through that input line in order to determine whether the light bulb is on or off or has failed. The states of all of the various lights are transmitted in parallel format to the central control module over wires 20. The open or closed state of the various doors and the boot are input to the central control module from sensing switches 22, and engine and other vehicle sensors are connected into the central module over wires 24. The conditions of all the monitored items of equipment are displayed on the displays 14, 16 and these displays may be of the vacuum flourescent type or of the liquid crystal type (e.g. display 16) or warning lamps incorporated in the main instrument panel, e.g. display 14, or any combination of these types of display. This prior art vehicle condition monitoring system has however the drawbacks discussed above.

Figure 2:
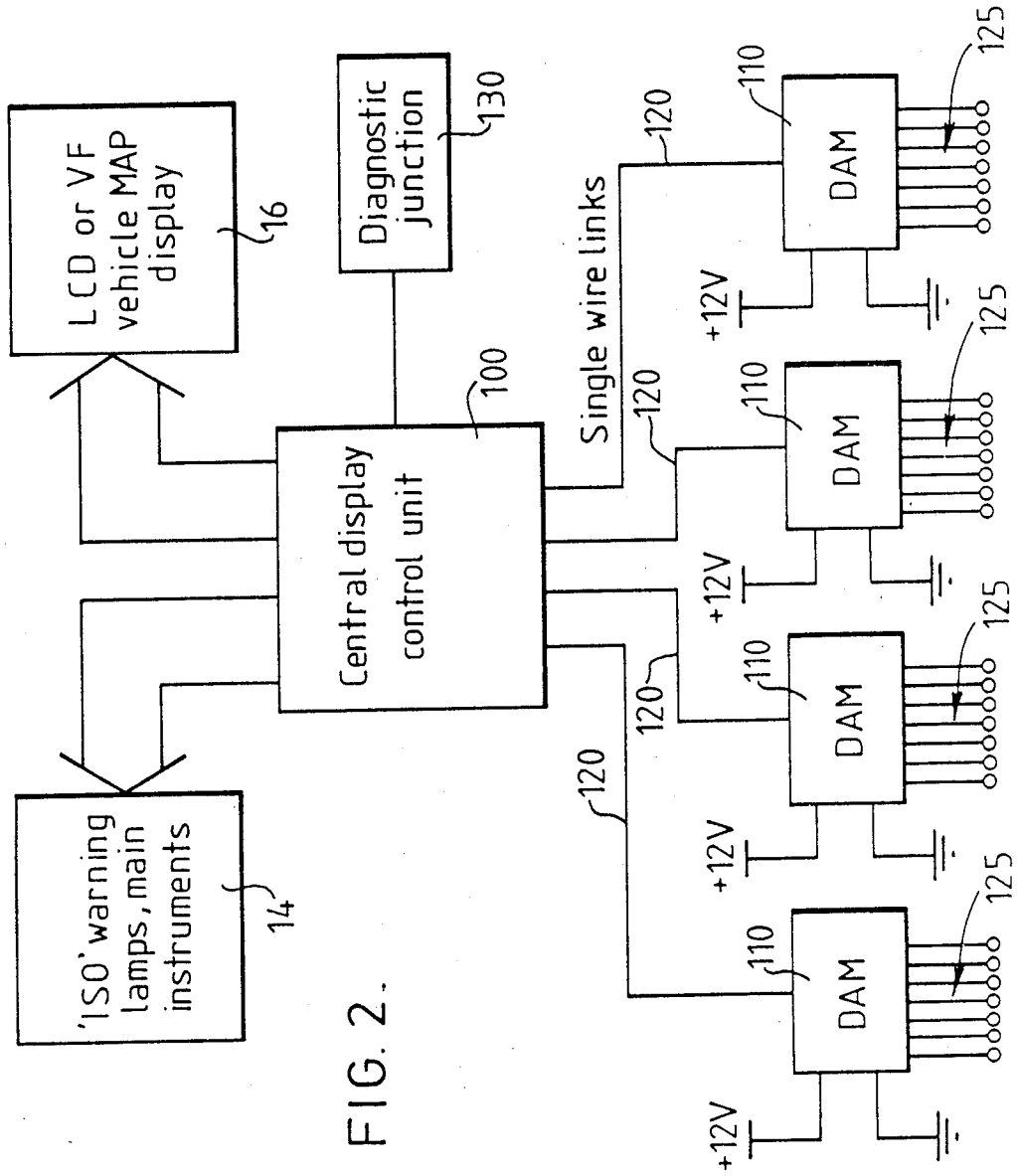
FIG. 2 is a schematic diagram of a vehicle condition monitoring system in accordance with this invention.

Referring now to FIG. 2, there is shown a vehicle condition monitoring system in accordance with this invention. Displays 14 and 16 (of the types or combination of types described for the system of FIG. 1) are driven by a central control unit 100. The system further comprises four data acquisition modules 110 strategically placed around the vehicles, and each is connected to the central control unit by a single wire link 120. Each data acquisition module has a plurality of inputs 125, one analogue and up to six switch or lamp failure inputs. The inputs are fed in parallel to each data acquisition module and the position of the latter is chosen to minimise the length of the input wires. Each data acquisition module also requires a ground connection and a 12 volt feed which is established by the vehicle ignition switch. The central control unit 100 is provided with a diagnostic junction 130 for connection to external equipment arranged to carry out diagnostic functions.

Figure 3:
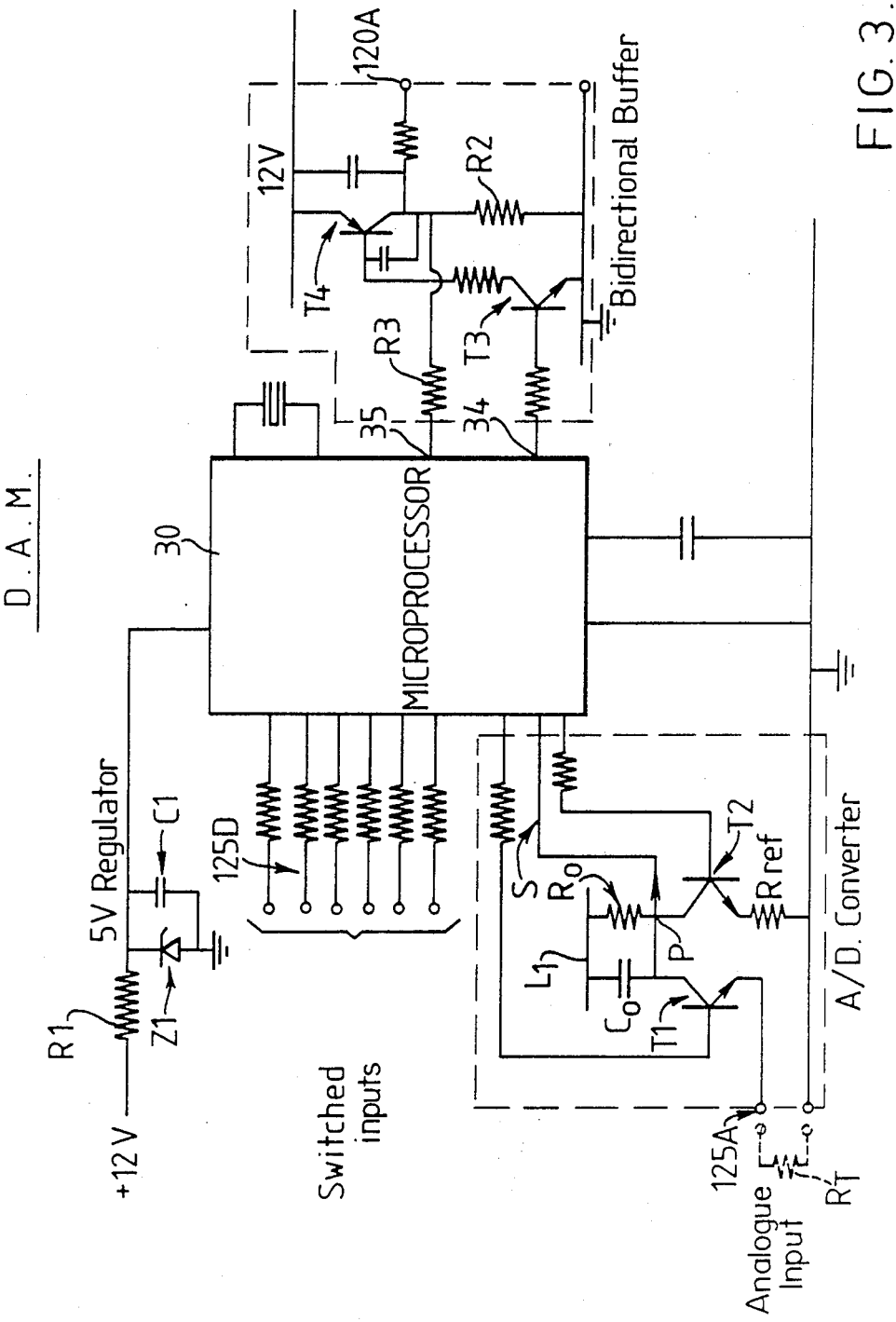
FIG. 3 is a circuit diagram of a data acquisition module used in the monitoring system of FIG. 2.

FIG. 3 shows the circuit of each data acquisition module and this is based upon a small and simple microprocessor for example a type TMP 42C40P manufactured by Toshiba. Power for this microprocessor is provided from the 12 volt vehicle supply via a regulator consisting of a series resistor R1 and a shunt circuit of Zener diode Z1 and a capacitor C1. The six switched inputs to the microprocessor are shown at 125D, each with a series resistor. The analogue input is shown at 125A and an analogue to digital converter is provided between this terminal and the microprocessor. This analogue to digital converter comprises a capacitor $C_o$ and a resistor $R_o$ connected in parallel between the power rail $L_1$ and a point P, a transistor T1 with its collector-emitter path connected between point P and analogue input terminal 125A, and a transistor T2 with its collector-emitter path connected between point P and a reference resistor $R_{ref}$ which has its other end connected to ground. the two transistors are controlled by respective lines from the microprocessor to their bases, these lines including series resistors, and the level of charge on the capacitor $C_o$ is detected by the microprocessor over a sensing line S.

In use, the analogue to digital converter operates as follws. Firstly both transistors T1 and T2 are switched off and the capacitor $C_o$ is discharged through resistor $R_o$. Then the microprocessor switches on transistor T2 for the capacitor $C_o$ to charge up through reference resistor $R_{ref}$ and transistor T2. The microprocessor times the period taken for the capacitor $C_o$ to charge a predetermined level, which is sensed by the microprocessor over sensing line S. Then the microprocessor switches off transistor T2 and allows time for the capacitor $C_o$ to discharge through resistor $R_o$. Then the microprocessor switches on transistor T1 for the capacitor $C_o$ to charge through the unknown resistance $R_T$ of the transducer which is connected between analogue input terminal 125A and ground, as diagrammatically indicated in FIG. 3. Again the microprocessor times the period taken for capacitor $C_o$ to charge to he same preetermined level, as sensed over sensing line S. The microprocessor then switches off transistor T1 in order for the capacitor $C_o$ to discharge through resistor $R_o$ and also the microprocessor divides the time taken for the capacitor to charge up through the reference resistor by the time taken for the capacitor to charge up through the unknown transducer resistance in order to provide the converted digital output.

The data acquisition module further comprises a bidirectional input-output buffer as shown in FIG. 3. As will be described below, data from the module is transmitted in serial format and so is applied (at 5 volt or 0 volt levels) to the base of a transistor T3 via a series resistor from microprocessor data output 34. The collector of this transistor 3 is connected via a collector resistor to the base of a transistor T4 which has it emitter connected to the 12 volt rail and its collector connected via a resistor R2 to ground (along with the emitter of transistor T3). The collector of transistor T4 is connected via a series resistor to a terminal 120A which is coupled by the single wire link 120 to the central control unit 100 of the vehicle condition monitoring system. The transistors T3 and T4 thus serve to change the 5 volt/0 volt data output to 12 volt/0 volts levels for transmission over link 120 to the control unit. The wake-up signal for the data acquisition module is received over the single wire link 120 from the control unit at the 12 volt level and resistor R2 serves to reduce this to the 5 volt level for application to the microprocessor input 35 via a further series resistor R3.

Figure 4:
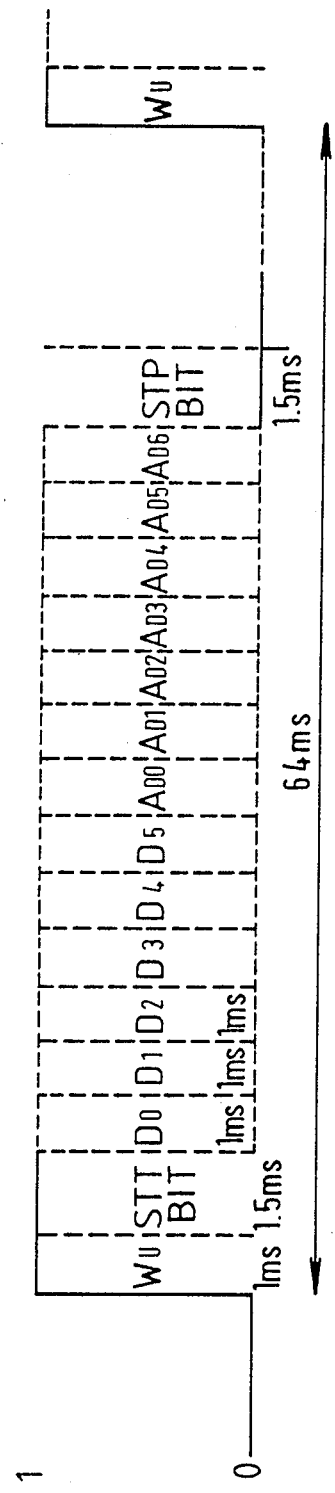
FIG. 4 is a diagram of the signals transmitted on the single wire between each data acquisition module and the central control unit of the monitoring system shown in FIG. 2.

The general operation of the vehicle conditioning monitoring system will now be described with reference to the data pattern diagram shown in FIG. 4. Each data acquisition module stores data representing the signals applied to its inputs 125 The central control unit 100 prompts the data acquisition modules in turn and in response to being prompted, each data acquisition module transmits its stored data to the central control unit 100. Each data acquisition module is prompted from the central control unit by a 1 ms "wake-up" signal Wu transmitted over the respective single wire link 120. Upon reception of this, the data acquisition module transmits a 1.5 ms start bit STT, then transmits digital bits $D_o$–$D_5$ (representing the switched inputs 125D) followed by analogue to digital conversion data bits $A_{Do}$–$A_{D6}$ and finally a 1.5 ms stop bit STP. Each of the data bits is of 1 ms duration. The data acquisition module next reads its inputs again and updates its data stored as necessary and then waits for the next "wake-up" signal $W_u$.

Figure 5A:
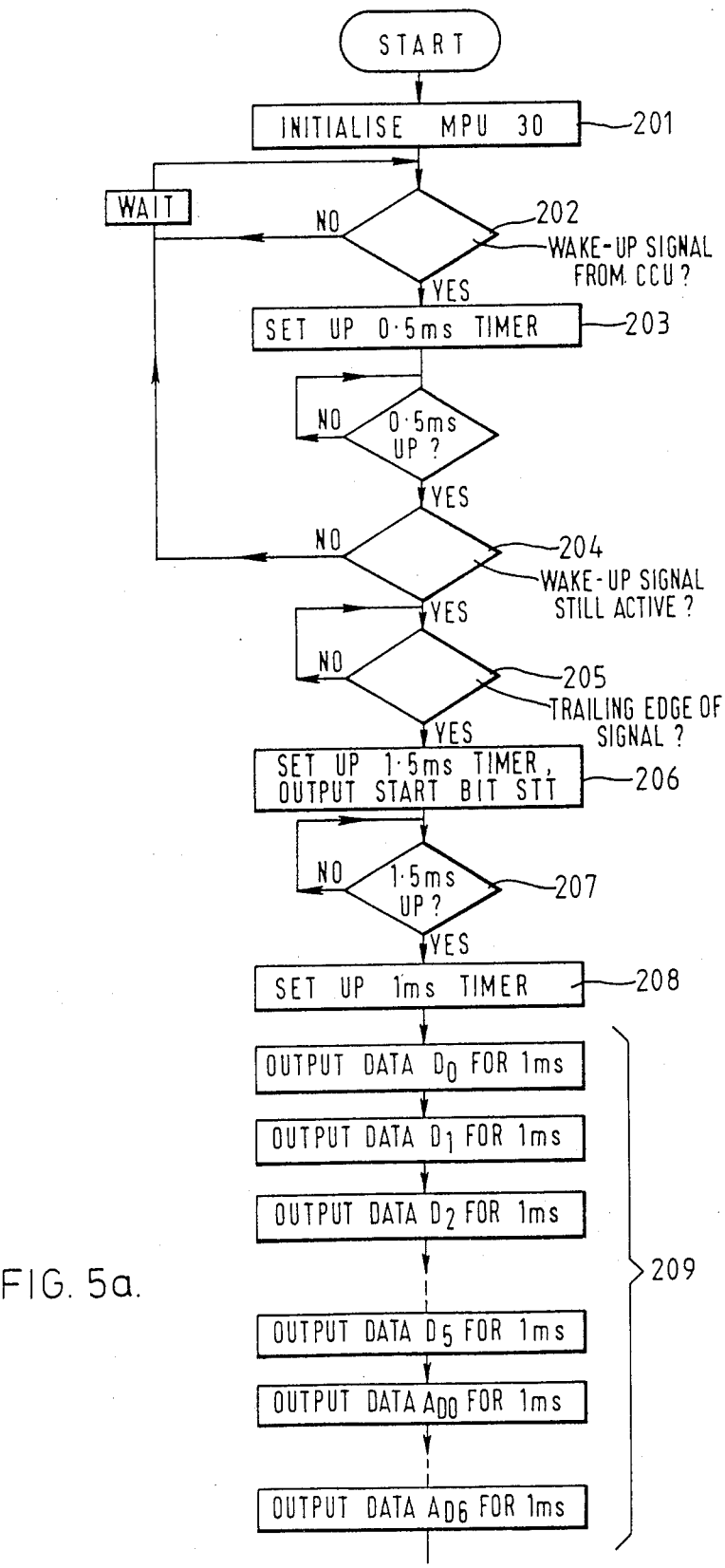
FIGS. 5a, 5b and 5c are flow chart of the software for the data acquisition module of FIG. 3.
Figure 5B:
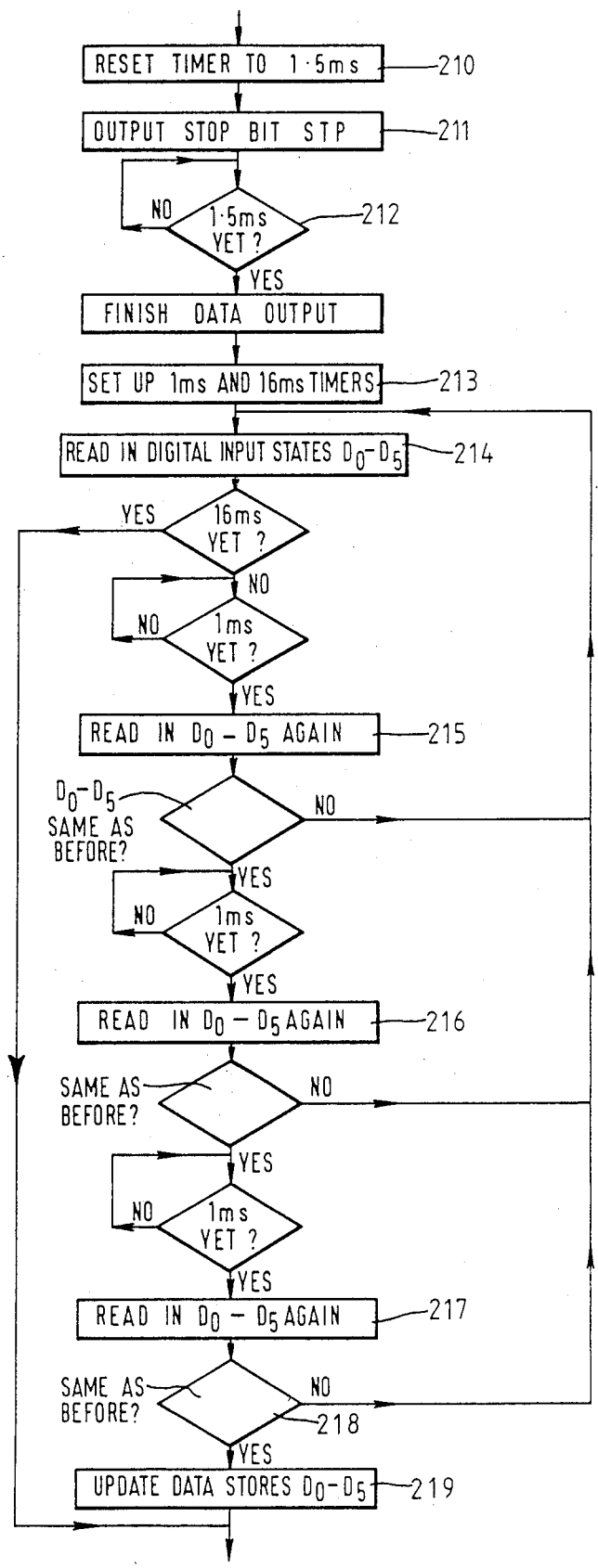
Figure 5C:
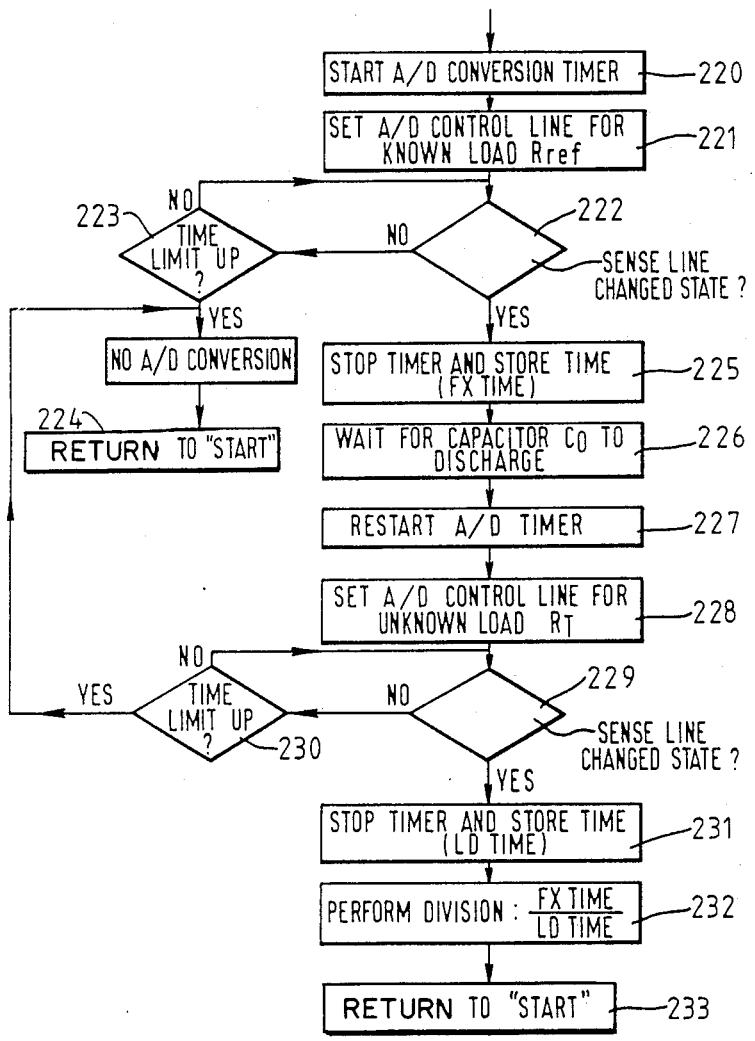

Operation of the data acquisition module will now be described in greater detail with reference to the flow chart shown in FIG. 5 of the software utilised by the microprocessor 30. The microprocessor is inactive until the ignition switch is turned on, whereupon it is initialised as at 201 of the flow chart. The data acquisition module then waits at 202 for a "wake-up" signal $W_u$ from the central control unit. When this signal is received, the module microprocessor sets up a 0.5 ms timer as at 203. If the "wake-up" signal $W_u$ is still active at the end of 0.5 ms (as determined at 204), step 205 waits for the trailing edge of the "wake-up" signal and then at 206 the start bit STT of 1.5 ms duration is transmitted from the microprocessor 30. When the 1.5 ms period for the start bit is timed out at 207, then at 208 a 1 ms timer is set up to govern the transmission of the data $D_o$–$D_5$ and $A_{Do}$–$A_{D6}$ at 209, then at 210 the timer is reset to 1.5 ms and the stop bit STP is transmitted at 211. Step 212 determines the end of the 1.5 ms period and this completes the data output. At 213 1 and 16 ms timers are set up in readiness for the start of the data input routine. At 214, the microprocessor reads in the input states $D_o$–$D_5$, being the signals on inputs 125D. After 1 ms delay, these are read in again at 215 and compared with the previous readings: if they are found identical, then after another 1 ms delay, the inputs are read in again at 216 and compared again with the previous readings. These procedures are followed once more at 217, 218: if all four readings are found identica, then the data stored for $D_{do}$–$D_5$ is updated. If at any of the comparison steps a discrepency is found between the two consecutive sets of data, then the program returns to the start 214 of the data input routine. Thus a degree of noise immunity is provided. An overall maximum time period of 16 ms is allowed for this part of the routine.

Then at 220 a timer is started to commence the analogue to digital conversion. At 221 the transistor T2 is switched on for the capacitor $C_o$ to charge up through the known resistor $R_{ref}$. At 222, the sense line S is monitored to detect when the charge on the capacitor $C_o$ reaches the predetermined level. If the capacitor fails to reach this predetermined level of charge within a certain period of time (233), then no analogue-to-digital conversion is effected and the program returns to the "start" (224). If the capacitor $C_o$ is detected as reaching the predetermined level of charge within the maximum period allowed, then at 225 the timer is stopped and the time taken (FXTIME) is stored. At 226 the transistor T2 is switched off and time is given for the capacitor $C_o$ to discharge through resistor $R_o$. At 227 the analogue-to-digital timer is restarted and at 228 transistor T1 is switched on for capacitor $C_o$ to charge up through the unknown transducer resistance $R_T$. At 229, the sense line S is monitored to detect when the charge on the capacitor $C_o$ reaches the predetermined level: again, if it fails to reach this level within an allowed time period (230), no anologue-to-digital conversion is effected and the program returns to "start" via 224. If however the capacitor $C_o$ reaches its predetermined level of charge within the period allowed, then at 231 the timer is stopped and time taken (LDTIME) is stored. Finally at 232 the microprocessor divides FXTIME by LDTIME to produce the 7-bit ($A_{Do}$–$A_{D6}$) converted digital data, which is stored. Then at 233 the program returns to its "start" to wait for the next "wake-up" singal $W_u$ from the central control unit 100.

The vehicle condition monitoring system which has been described with reference to FIGS. 2 to 5 of the accompanying drawings achieves considerable simplification of the wiring required between the various sensing switches and transducers and the central control unit. This provides savings in respect of wiring harnesses and connectors but also lead to greater reliability and the potential for monitoring a greater number of items of equipment on the vehicle.

What is claimed is:

1. In a vehicle having a plurality of variable condition devices and a plurality of condition monitoring transducers for said devices, a condition monitoring system comprising:
    (i) a central control unit;
    (ii) a plurality of remote data acquisition modules, each having a plurality of inputs responsive to said condition monitoring transducers and data storing means for storing data representing data signals received at said inputs; and
    (iii) a single communication wire for each data acquisition module and connecting the respective data acquisition module to the central control unit;
    (iv) the central control unit further comprising means for prompting each data acquisition module in turn over the respective single communication wire; and
    (v) each data acquisition module comprising means responsive to said prompting for transmitting the data stored in the respective data storing means to the central control unit over the respective single communication wire wherein an input of at least one data acquisition module is an analogue input, and said one data acquisition module comprises an analog-to-digital converter connected to said analog input, said converter comprising:
    a capacitor,
    a reference resistor,
    a first current path including said reference resistor for modifying the charge on said capacitor from a first predetermined level to a second predetermined lever,
    a transducer of variable resistance responsive to said analogue input,
    a second current path including said transducer for modifying the charge on said capacitor from said first predetermined level to said second predetermined level, control means for modifying the charge on said capacitor through each of said first and second current paths and for resetting said capacitor to said first predetermined level after each charge modification, and
    means for determining and comparing respective time periods taken for the charge on said capacitor to change from said first predetermined level to said second predetermined level along said first and second current paths, respectively, to provide a digital representation of the transducer resistance.

2. A condition monitoring system as claimed in claim 1, in which the prompting means of the central control unit comprises means for sending periodically a "wake-up" signal to each data acquisition module in turn over the respective single communication wire, and the transmitting means in each data acquisition module is responsive to a received "wake-up" signal and transmit said stored data in serial format over the respective single communication wire to the central control unit.

3. A condition monitoring system as claimed in claim 2, in which each data acquisition module comprises means for reading said data signals, received at the inputs of the respective data acquisition module, after each transmission to the central control unit of the data stored in the data storing means of the respective data acquisition module, and for updating the data stored in said data storing means in readiness for the next "wake-up" signal to be transmitted to the respective data acquisition module.

4. A condition monitoring system as claimed in claim 3, in which said signal reading means of each data acquisition module comprises means for reading the data signals received at the respective said inputs more than once after each said transmission of data to the central control unit, and for comparing the data signals at each reading with the signals from the previous reading, before updating the data stores in the data storing means of the respective data acquisition module.

5. A condition monitoring system as claimed in claim 4, in which said signal reading means of each data acquisition module includes means for updating the data in the data storing means of the respective data acquisition module only if the compared, consecutive signal readings are identical.

6. An analogue-to-digital converter, comprising:
an input,
a variable-resistance transducer connected to said input,
a reference resistor,
a capacitor,
a first current path including said reference resistor for modifying the charge on said capacitor from a first predetermined level to a second predetermined level,
a second current path including said variable-resistance transducer for modifying the charge on said capacitor from said first predetermined level to said second predetermined level, control means for modifying the charge on said capacitor through each of said first and second current paths and for resetting said capacitor to said first predetermined level after each charge modification, and means for determining and comparing respective time periods taken for the charge on said capacitor to modify from said first predetermined level to said second predetermined level along said first and second current paths, respectively, and providing a digital representation of the transducer resistance.

7. A data acquisition module, comprising a plurality of data signal inputs and an input/output terminal for connecting to a single communication wire, the module comprising:
means for reading signals received at said signal inputs,
a data storing means for storing data representing said signals, and
a transmitting means, responsive to a prompt signal received at said input/output terminal over said single communication wire, for transmitting over said wire the data stored in said data storing means wherein one of said data signal inputs comprises an analogue input, and said signal reading means comprises an analog-to-digital converter responsive to said analogue input, said converter comprising:
a capacitor,
a reference resistor,
a first current path including said reference resistor for modifying the charge on said capacitor from a first predetermined level to a second predetermined level,
a transducer of variable resistance responsive to said analogue input,
a second current path including said transducer for modifying the charge on said capacitor from said first predetermined level to said second predetermined level, control means for modifying the charge on said capacitor through each of said first and second current paths and for resetting said capacitor to said first predetermined level after each charge modification, and
means for determining and comparing respective time periods taken for the charge on said capacitor to change from said first predetermined level to said second predetermined level along said first and second current paths, respectively, to provide a digital representation of the transducer resistance.

8. A data acquisition module as claimed in claim 7, in which said signal reading means comprises means for reading said data signal inputs after each transmission of the data stored in said data storing means, and for updating the data in said data storing means in readiness for the next prompt signal to be received at said input/output terminal.

9. A data acquisition module as claimed in claim 8, in which said signal reading means comprises means for reading said data signal inputs more than once after each said transmission, and, for comparing the signals at each reading with the signals at the previous reading, before updating the data stored in the data storing means.

10. A data acquisition module as claimed in claim 9, in which said signal reading means comprises means for updating the data in the data storing means only if the compared, consecutive data signal readings are identical.

* * * * *